US00RE37581E

(19) United States
(12) Reissued Patent
Haveaux et al.

(10) Patent Number: US RE37,581 E
(45) Date of Reissued Patent: Mar. 12, 2002

(54) BITUMINOUS COMPOSITIONS CONTAINING LINEAR COPOLYMERS

(75) Inventors: Bernard Haveaux, Petit-Roeulx-lez-Nivelles; Emmanuel Lanza, Waterloo; Jean-Philippe Hallet, Woluwe-St-Pierre; André Noiret, Gembloux, all of (BE)

(73) Assignee: Fina Research, S.A., Feluy (BE)

(21) Appl. No.: 09/630,181

(22) Filed: Aug. 1, 2000

Related U.S. Patent Documents

Reissue of:
(64) Patent No.: 6,008,277
Issued: Dec. 28, 1999
Appl. No.: 09/004,230
Filed: Jan. 8, 1998

(30) Foreign Application Priority Data

Jan. 8, 1997 (EP) ..... 97100185

(51) Int. Cl.[7] ..... C08L 95/00
(52) U.S. Cl. ..... 524/68
(58) Field of Search ..... 524/68

(56) References Cited

U.S. PATENT DOCUMENTS 4,196,115 A * 4/1980 Bresson ..... 524/68
4,391,949 A * 7/1983 St. Clair ..... 525/99
4,530,652 A * 7/1985 Buck et al. ..... 442/86
4,585,816 A * 4/1986 Vituske et al. ..... 524/68

FOREIGN PATENT DOCUMENTS

EP 0009209 * 4/1980
EP 0317025 * 5/1989

* cited by examiner

*Primary Examiner*—Peter Szekely
(74) *Attorney, Agent, or Firm*—William D. Jackson

(57) ABSTRACT

The present invention relates to bituminous compositions used for roofing and waterproofing membranes or material comprising asymmetrical linear polyvinyl aromatic-polydiene block copolymers having improved physical properties over broader ranges of service temperatures than those obtained from bituminous compositions prepared with symmetrical block copolymers of similar type.

The asymmetry of the copolymer which is characterised by polyvinyl aromatic endblocks of at least two different molecular weights, one high and one low, ensures improved physical performance to roofing and waterproofing membranes made from such compositions.

20 Claims, No Drawings

BITUMINOUS COMPOSITIONS CONTAINING LINEAR COPOLYMERS

Matter enclosed in heavy brackets [ ] appears in the original patent but forms no part of this reissue specification; matter printed in italics indicates the additions made by reissue.

CROSS REFERENCE TO RELATED APPLICATION

This application claims priority of pending application filed in Belgium on Jan. 8, 1997, Application Number 97100185.4 to the same inventors as the present application.

FIELD OF THE INVENTION

The present invention relates to polymer-modified bituminous compositions, used for roofing and waterproofing membranes or material.

BACKGROUND OF THE INVENTION

Physical properties of a bituminous composition used for roofing and waterproofing membranes or material such as low temperature break resistance, flexibility, high temperature flow resistance and viscosity can be improved, as disclosed in U.S. Pat. No. 4,530,652, by incorporating radial elastomeric block copolymers whose structure is defined by the general formula $(A–B)_nY$ wherein Y is the residue of a polyfunctional coupling agent, (A–B) represents a single arm constituted of a polydiene block B and a polyvinyl aromatic endblock A, and "n" represents the number of arms (A–B). Bituminous compositions comprising such copolymers, when used for roofing or waterproofing membranes, indeed provide good performance properties. However, the latter are obtained at the detriment of other physical properties limiting their broader applications. For example, when those elastomeric block copolymers are added to a bituminous material to improve high temperature properties, the low temperature performance is impaired. Likewise, when both high and low temperature properties are met, the viscosity of the roofing materials is such as to render its handling inoperable with standard equipment.

In U.S. Pat. No. 4,196,115, two radial elastomeric block copolymers, one having a low, the other having a high molecular weight, (or, alternatively, one radial of high molecular weight and one linear elastomeric block copolymer of low molecular weight) are blended together with a bituminous component to prepare a roofing material. Both copolymers are selected in such a way that the final bituminous composition yields the desirable high and low temperature properties satisfying tests which determine the said properties for ultimate use of the roofing membranes. Unfortunately, this process implies the mixture of at least two compounds, namely two separately-prepared copolymers, with a bituminous component in order to obtain compositions that give the desired properties to the final membranes.

The present invention aims at new bituminous compositions which enable to enlarge the range of service temperatures of roofing and waterproofing membranes or material, without impairing appropriate viscosities that allow an easy handling with standard installation equipment, by proposing bituminous compositions that do not require the presence of two or more separately-prepared (co)polymers in bituminous compositions in order to be especially suitable to those applications.

An objective of this invention is to provide improved bituminous compositions which are suitable for roofing and waterproofing material or membranes.

A further objective of this invention is to disclose a bituminous composition which does not require the presence of more than one copolymer component.

A further objective of this invention is to enlarge the range of the working temperatures for roofing and waterproofing membranes or material which are made from these bituminous compositions.

A further objective of this invention is to ensure appropriate dynamic viscosities to the bituminous composition such that an easy handling of the ultimate roofing and waterproofing material or membranes be possible with standard installation equipments.

SUMMARY OF THE INVENTION

The present invention relates to bituminous compositions, used for roofing and waterproofing membranes or material, which consist of a bituminous component and one or more rubbery components constituted of linear polyvinyl aromatic polydiene block copolymer having an asymmetrical structure, the term "asymmetrical" meaning that the endblocks in the molecular structure are polyvinyl aromatic segments of at least two different lengths, one short and one long.

More particularly, the bituminous composition of this invention is constituted of a bituminous component and at least one elastomeric block copolymer whose molecular structures are described by the general formula $A_1$-X-$A_2$ in which $A_1$ and $A_2$ represent polymeric endblocks of monovinyl aromatic monomers and X an elastomeric segment. These asymmetrical elastomeric block copolymers are characterised by endblocks $A_1$ and $A_2$ having at least two different molecular weights, one "high" and one "low".

It has been unexpectedly found that improved physical properties at both high and low temperature of a bituminous composition are obtained by incorporating small amounts of such asymmetrical elastomeric block copolymers in a bituminous composition. The copolymer-containing bituminous composition and obtained by this invention is surprisingly provided with all the desired physical performance that gives to final roofing and waterproofing membranes or material, broader ranges of working temperatures and appropriate dynamic viscosities required by standard application equipments. The improved ranges of service temperatures, which are defined as the difference between the softening point and the cold-bending temperature, give to the ultimate membranes both good high and low temperature performance sot that they can be used under prevailing environmental conditions in any geographical location.

DETAILED DESCRIPTION OF THE INVENTION

In the following description, the peak molecular weights $M_p$ of copolymers or polymeric segments are peak molecular weights that appear on the molecular weight distribution curve generated by Gel Permeation Chromatography analyses that are performed on those copolymers or segments.

The bituminous compositions of the invention essentially consist of (I) a bituminous component having a penetration grade according to ASTM D5-75 ranging from 3 to 30 mm at 25° C., and (II) at least one block copolymer constituted of polymerised monomer units of (a) at least one monovinyl aromatic hydrocarbon and (b) at least one conjugated diene, the said block copolymer comprising from 50 to 82% by weight of polymerised monomer (b), having a peak molecular weight ranging from 75000 to 350000, and having the general formula $A_1$-X-$A_2$ in which $A_1$ and $A_2$ represent polymeric endblocks of monovinyl aromatic monomers (a), and X elastomeric segments essentially constituted of polymerised conjugated diene monomers (b), the total amount of copolymer (II) in the bituminous component (I) ranging form 1 to 20% by weight of the total (I)+(II), the bituminous compositions being characterised in that the said copolymer contains endblocks $A_1$ and $A_2$ having two different peak molecular weights, one being comprised between 15000 and 60000 and one being comprised between 5000 and 25000, the ratio (c) of the highest to the lowest peak molecular weight being equal to or greater than 1.2.

Structural Definition of the Copolymers

The compositions of this invention essentially contain a bituminous component and at least one asymmetrical linear elastomeric block copolymer whose structures are described by the general formula $A_1$-X-$A_2$ in which $A_1$ and $A_2$ represent polymeric blocks of monovinyl aromatic monomers and X an elastomeric segment essentially constituted of polymerised conjugated diene monomers.

The term "asymmetrical" means that the endblocks $A_1$ and $A_2$, in the molecular structure described hereabove, have at least two peak molecular weights, one high and one low. The asymmetry ration of such a copolymer is defined as the ratio of the highest to the lowest peak molecular weight of the endblocks $A_1$ and $A_2$. When this ratio is equal to or grater than 1.2, the copolymer is said "asymmetrical"; when this ratio is lower than 1.2, the copolymer is said "symmetrical". In the scope of this invention, the asymmetry ratio of an asymmetrical copolymer is equal to or greater than 1.2 and preferably grater than 1.4.

It has surprisingly been found that the asymmetry characteristic of copolymers of this invention was able to give to roofing and waterproofing membranes or material broader ranges of service temperatures, without impairing other necessary physical properties such as dynamic viscosities at high temperature.

Monomer Definitions

The monovinyl aromatic monomers which constitute the polymeric endblocks $A_1$ and $A_2$ contain from 8 to 18 carbon atoms. Examples of such monomers include styrene (ethenylbenzene), alpha-methylstyrene, vinylpyridine, ethylstyrene, t-butylstyrene, isopropylstyrene, dimethylstyrene, other alkylated styrenes, and the like; among them, the most preferred monomer used for this invention is the styrene.

The conjugated diene monomers which essentially constitute the elastomeric segments X contain from 4 to 12 carbon atoms. Examples of such monomers include 1,2-butadiene, isoprene (2-methyl 1,3-butadiene), ethylbutadiene, phenylbutadiene, piperylene, dimethylbutadiene, hexadiene, ethylhexadiene, and the like; among them, 1,3-butadiene is generally preferred.

Specifications of Block Copolymers

The asymmetrical elastomeric block copolymers used in the present invention and represented by the general formula $A_1$-X-$A_2$ can be prepared by well known anionic polymerisation processes in which, for example, an organo-lithium initiator, a vinyl aromatic monomer, a conjugated diene monomer and again a vinyl aromatic monomer are sequentially added in proper amounts to obtain a block copolymer constituted of a polyvinyl aromatic, polydiene and polyvinyl aromatic segments.

The molecular weight distribution of such copolymers is characterised by a peak molecular weight ranging from 75000 to 350000.

Such copolymers comprise from 18 to 50% and preferably 27 to 35% by weight of polymerised monovinyl aromatic monomers and from 50 to 82% and preferable 65 to 73% by weight of polymerised conjugated diene monomers.

The elastomeric segments X contain essentially polymerised conjugated diene monomers, and have preferably a peak molecular weight ranging from 20000 to 160000. As already described in the structural definition of the copolymers of this invention, the polymeric endblocks $A_1$ and $A_2$ of monovinyl aromatic monomers have at least two different peak molecular weights whose highest and lowest values define the asymmetry ratio. For such endblocks, one peak molecular weight ranges from 15000 to 60000 and one form 5000 to 25000.

Copolymer Concentration in the Bituminous Composition

The copolymer weight concentration in the bituminous composition of this invention ranges from 1 to 20% and preferably from 8 to 15%.

The compositions of this invention appear under the form of copolymer-bituminous component mixtures having two phases, namely the rubber phase which mainly contains the block copolymers and the bituminous phase which mainly contains the bituminous component. Preferably, the copolymer concentration will be sufficiently high as to have the rubber phase as the continuous phase and the bituminous phase as the dispersed phase. It has been observed that said sufficiently high concentration is generally 8%.

It is easy for an average skilled in the art to observe when the rubber phase becomes the continuous phase while preparing a composition of this invention; when he mixes, in a hot liquid bituminous component, a suitable amount of block copolymers to prepare the composition, the rubber phase is at first the dispersed phase. After stirring, when the rubber phase becomes the continuous phase, the dynamic viscosity of the hot liquid mixture jumps by about 50% or more to a new plateau value.

Bituminous Component

Bituminous components used to prepare bituminous compositions of this invention are derived petroleum products characterised by having penetration grades ranging from 30 to 300 tenths of millimeter at 25° C., as measured by the ASTM standard procedure D5-75. Those components can be oxidized or non oxidized bitumen. Non oxidized bitumen are generally preferred.

Block Copolymer Examples

Table 1.1 describes examples of possible asymmetrical block copolymers, that are suitable to this invention, with their structural characteristics. The polyvinyl aromatic end blocks have only two peak molecular weights, the highest one ($A_1$, $M_p$) and the lowest one ($A_2$, $M_p$) that are used to compute the asymmetry ratio.

TABLE 1.1

COPOLYMER DESCRIPTION in Invention Specifications

| | | | Elastomeric Segments | | |
|---|---|---|---|---|---|
| Name | asym. ratio | Mp | monom type | average Mp | W % |
| BL-6 | 4.22 | 172000 | butadiene | 119000 | 69.4 |
| BL-7 | 4.11 | 165000 | butadiene | 108000 | 65.6 |

| | Endblocks | | | |
|---|---|---|---|---|
| Name | monom type | $A_1$ Mp | $A_2$ Mp | Comments |
| BL-6 | styrene | 42600 | 10100 | non tapered linear structure |
| BL-7 | styrene | 45600 | 11100 | tapered linear structure |

Mp: measured peak molecular weight
W: Weight percent of elastomeric segments in copolymer

Fillers and additives

It is obvious to those skilled in the art that additives other than those considered as a part of this invention can be included in the present compositions or in components thereof while or before preparing the present compositions to accomplish special functions or to enhance the contribution to required properties.

For example, various additives as antioxidants, fire retardants, or fillers as carbonates, silicates, mineral aggregates, fibers may be advantageously included in the bituminous composition of this invention to prepare roofing and waterproofing membranes or material.

TABLE 1.2

ROOFING OR WATERPROOFING MEMBRANES fillers and additives in the compositions

| Compounds | Weig. parts per 100 parts of bituminous composition |
|---|---|
| silicates | 25–85 |
| antioxidants | 0.0–0.5 |
| fibers | 0.0–2.0 |

In table 1.2, possibilities of general formulation show typical concentration ranges for additives and fillers that can be included in a bituminous composition of the present invention to prepare roofing and waterproofing membranes or material.

Example of Mixing and Blending Procedure

Standard equipment to blend copolymers with a bituminous component can be used to prepare the bituminous composition. The proper selection of the mixer is known to the average skilled in the art and needs thus not to be discussed.

Standard mixing procedures, well known by those average skilled in the art, may advantageously be used here. The method described herebelow given as an example is not limitative; a high shear mixer can be an appropriate equipment for this invention to blend the copolymer with the bituminous component.

A bituminous component is charged in a beaker and heated to about 180° C. A slow stirring ensures a constant temperature throughout the material. Pellets, flakes, crumbs, powder or other forms of the elastomeric block copolymers are introduced at room temperature in the hot bituminous component. The compositions is shear mixed at a rotation speed adjusted to keep the bitumen temperature between 180 and 200° C. until a homogeneous mixture is obtained. The variations of the mixture viscosity are recorded by the agitator torque. When the viscosity jumps of about 50% or more to a new plateau value, the rubber phase is the continuous phase.

At this time, the following tests are achieved to evaluate the physical performance of the bituminous composition:

Ring and Ball temperature (R&B, ASTM D36-76) giving the softening point.

Cold-Bending temperature (C-B, DIN 52123); the sheet samples of three millimeters thick are bent on a 30 mm mandrel.

Dynamic Viscosity at 160 and 180° C. (Dyn. Visc., test described herebelow).

The working temperature ranges are computed as the difference between the Ring and Ball and the Cold-Bending temperatures.

The Dynamic Viscosity is determined by a "Cone-Plate" rotary viscosimeter system of type "HAAKE". The selected cone for this application is labeled "PK1-1°", 1° meaning that the cone has an aperture angle of [180°–(2×1°)] or 178°. When the viscosimeter reaches the operating temperature of 160 or 180° C., about 0.5 of hot copolymer-bituminous component mixture is laid down on the hot plate. The hot cone is pressed down to the plate which is covered by the hot copolymer-bituminous component paste. When the operating temperature is reached throughout the system, the cone starts to rotate up to a shear rate of 100 $sec^{-1}$ in 200 seconds. At a constant shear rate of 100 $sec^{-1}$, 50 shear stress cone-plate values are monitored over two minutes, averaged and converted into dynamic viscosities with an appropriate conversion factor.

A good operability of a bituminous composition means that the dynamic viscosity ranges from about 1.0 to about 2.5 Pa.s at 180° C. and from about 2 to about 4 Pa.s at 160° C.

Description of Examples

Examples of elastomeric block copolymers which are in the invention specifications are described on table 1.1. The copolymers are blended with a bituminous component at 180° C., to obtain a homogeneous mixture of copolymer and bituminous component. After a period varying from 40 to 120 minutes of stirring depending on the copolymer concentration, the rubber phase becomes the continuous phase. At his time, appropriate samples are taken to measure the Ring and Ball temperature, the Cold-Bending temperature and the dynamic viscosities according to the standard procedures described above.

For the understanding of the examples and comparative examples, an asymmetrical block copolymer of this invention is said comparable to a symmetrical block copolymer when the essential difference between them resides in the asymmetry ratio, all the remaining factors being comparable. Table 1.3 summarises an example of an out of invention specifications copolymer that is used for a comparative example. An example of comparable asymmetrical and symmetrical copolymers is the copolymer BL-6 on table 1.1 and BL-c on table 1.3.

mer BL-6 has a strong asymmetry ration of 4.22 with endblock peak molecular weights of 42600 and 10100.

As illustrated on table 2.1, this mixture results in a Ring and Ball temperature of 111° C., a Cold-Bending temperature of 31 48° C. and a working temperature range of 159° C. The dynamic viscosities of 2.6 Pa.s at 160° C. and 1.4 Pa.s at 180° C. remain in an adequate range as defined previously in the description of this invention.

TABLE 2.1

| COPOLYMER DATA | | | | | | | | | | | BIT. COMPOS. RESULTS | | | | |
|---|---|---|---|---|---|---|---|---|---|---|---|---|---|---|---|
| | | | Elast. Segments | | | Endblocks | | | weig. | BIT. COMPON | | | W. T° | dyn. viscosity | |
| Name | asym ratio | Mp | type | aver. Mp | W % | mon. type | $A_1$ Mp | $A_2$ Mp | conc. % | Pen @ 25° C. dmmm ($10^{-4}$ m) | R & B ° C. | C-B ° C. | range ° C. | 180° C. Pa · s | 180° C. Pa · s |
| BL-6 | 4.22 | 172000 | butad | 119000 | 69.4 | styr. | 42600 | 10100 | 13 | 180/200 | 111 | −48 | 159 | 2.6 | 1.4 |
| Comparative example: | | | | | | | | | | | | | | | |
| BL-c | 1.00 | 173400 | butad | 121000 | 70.0 | styr. | 26000 | 26000 | 13 | 180/200 | 105 | −34 | 139 | 3.2 | 1.7 |

Mp: measured peak molecular weight
W: Weight percent of elastomeric segments in copolymer

TABLE 1.3

COPOLYMER DESCRIPTION
Out of Invention Specifications

| | | | Elastomeric Segments | | |
|---|---|---|---|---|---|
| Name | asym. ratio | Mp | monom type | average Mp | W % |
| BL-c | 1.00 | 173000 | butadiene | 121000 | 70.0 |

| | Endblocks | | | |
|---|---|---|---|---|
| Name | monom type | $A_1$ Mp | $A_2$ Mp | Comments |
| BL-c | styrene | 26000 | 26000 | symmetrical linear structure |

Mp: measured peak molecular weight
W: Weight percent of polymerised diene monomers copolymer All the bituminous compositions are prepared by blending copolymers of tables 1.1 or 1.3 with bituminous components of various penetration grades. No fillers nor additives have been included to these compositions.

A comparative example of bituminous composition is performed by blending a comparable symmetrical copolymer BL-c in the same concentration of 13% with the same bituminous component. As illustrated on table 2.1, both copolymers, BL-6 and BL-c, have comparable molecular weights 172000 and 173000 and very near weight contents of polymerised conjugated diene monomers, namely 69.4 and 70.0%. The bituminous composition of this comparative example results in a working temperature range of 139° C. i.e. 20° C. less than the range obtained with the previous composition of this invention. This comparative example demonstrates that advantageous properties are obtained form compositions of this invention comprising asymmetrical copolymer in the specifications of this invention.

EXAMPLE 2

Table 2.2 illustrates a bituminous composition prepared by blending a bituminous component B80/100 with asymmetrical copolymer BL-7. The endblock peak molecular weights of 45600 and 11100 respectively correspond to an asymmetry ratio of 4.11; the peak molecular weight of copolymer is 165000 and the weight concentration in the composition is 13%.

| COPOLYMER DATA | | | | | | | | | | | BIT. COMPOS. RESULTS | | | | |
|---|---|---|---|---|---|---|---|---|---|---|---|---|---|---|---|
| | | | Elast. Segments | | | Endblocks | | | weig. | BIT. COMPON | | | W. T° | dyn. viscosity | |
| Name | asym ratio | Mp | type | aver. Mp | W % | mon. type | $A_1$ Mp | $A_2$ Mp | conc. % | Pen @ 25° C. dmmm ($10^{-4}$ m) | R & B ° C. | C-B ° C. | range ° C. | 180° C. Pa · s | 180° C. Pa · s |
| BL-7 | 4.11 | 165000 | butad | 106000 | 65.6 | styr. | 45600 | 11100 | | | | | | | |

Mp: measured peak molecular weight

The description of the copolymers components and bituminous components, and the physical performance obtained form the bituminous compositions made from are tabulated and commented for each example.

EXAMPLE 1

Asymmetrical non tapered linear block copolymer BL-6 is blended in a bituminous component B180/200. Copolymer The Ring and Ball temperature of 108° C. and the Cold-Bending temperature of 31 42° C. result in an enlarged range of working temperature of 150° C. while the dynamic viscosities of 2.7 Pa.s at 160° C. and 1.2 Pa.s at 180° C. still remain in an adequate range of easy operability.

For examples 1 and 2 outlined hereabove, the physical properties that are obtained from the bituminous compositions of this invention are summarised on table 3.

| | Copolymer | | | Bituminous Composition Properties | | | | |
|---|---|---|---|---|---|---|---|---|
| | | Weight | Bit. Compon. | | | Range of | Dyn. Viscosity | |
| Example Nb | Name | in mixt. % | Pen @ 25° C. dmm ($10^{-4}$m) | R & B ° C. | C-B ° C. | serv. T° ° C. | @ 160° C. Pa · s | @ 180° C. Pa · s |
| 1 | BL-6 | 13 | 180/200 | 111 | −48 | 159 | 2.6 | 1.4 |
| 2 | BL-7 | 13 | 80/100 | 108 | −42 | 150 | 2.7 | 1.2 |

R & B: Ring and bell temperature
C-B: Cold-bearing temperature

We claim:

1. Bituminous compositions essentially consisting of:

(i) a bituminous component having a penetration grade according to ASTM D5-75 ranging 3 to 30 mm at 25° C., and (ii) at least one linear block copolymer constituted of polymerized monomer units of (a) at least one monovinyl aromatic hydrocarbon and (b) at least one conjugated diene, the said block copolymer comprising form 50 to 82% by weight of polymerized monomer (b), having a peak molecular weight ranging from 75000 to 350000, and having the general formula $A_1$-X-$A_2$in which $A_1$ and $A_2$ represent polymeric endblocks of monovinyl aromatic monomers (a), and X elastomeric segments essentially constituted of polymerized conjugated diene monomers (b), the total amount of copolymer (II) in the bituminous component (I) ranging from 1 to 20% by weight of the total (I)+(II), the bituminous compositions being characterized in that the said copolymer contains endblocks $A_1$ and $A_2$ having two different peak molecular weights, one being comprised between 15000 and 60000 and one being comprised between 5000 and 25000 whereby the linear block copolymer has an asymmetric structure, the ratio (c) of the highest to the lowest peak molecular weight being equal to or greater than 1.2.

2. A bituminous composition according to claim 1 wherein each block copolymer contains elastomeric segments X whose peak molecular weight ranges from 2000 to 160000.

3. A bituminous composition according to claims(s) 1 and wherein the copolymer comprises from 65 and 73% by weight of polymerized monomers (b).

4. A bituminous composition according to claims(s) 1 wherein the monomer (a) is styrene and the conjugated diene monomer (b) is selected from the group consisting of 1,3-butadiene (or) and isoprene.

5. A bituminous composition according to claim(s) 1 wherein the block copolymer forms a continuous rubber phase.

6. A bituminous composition according to claim(s) 1 wherein the block copolymer weight concentration ranges from 8% to 15%.

7. A bituminous composition according to claim(s) 1 wherein the ration (c) is greater than 1.4.

8. A bituminous composition according to claim 2 wherein the copolymer comprises from 65 to 73% by weight of polymerized monomers (b).

9. A bituminous composition according to claim 2 wherein the monomer (a) is styrene and the conjugated diene monomer (b) is selected from the group consisting of 1,3-butadiene and isoprene.

10. A bituminous composition according to claim 3 wherein the monomer (a) is styrene and the conjugated diene monomer (b) is selected from the group consisting of 1,3-butadiene and isoprene.

11. A bituminous composition according to claim 2 wherein the block copolymer forms a continuous rubber phase.

12. A bituminous composition according to claim 3 wherein the block copolymer forms a continuous rubber phase.

13. A bituminous composition according to claim 4 wherein the block copolymer forms a continuous rubber phase.

14. A bituminous composition according to claim 2 wherein the ratio (c) is greater 1.4.

15. A bituminous composition according to claim 3 where the ratio (c) is greater than 1.4.

16. A bituminous composition according to claim 4 wherein the ratio (c) is greater than 1.4.

17. A bituminous composition according to claim 5 wherein the ratio (c) is greater than 1.4.

18. A bituminous composition according to claim 6 wherein the ratio (c) is greater than 1.4.

19. A membrane including a bituminous composition essentially consisting of:

(i) a bituminous component having a penetration grade according to ASTM D5-75 ranging 3 to 30 mm at 25° C., and (ii) at least one linear block copolymer constituted of polymerized monomer units of (a) at least one monovinyl aromatic hydrocarbon and (b) at least one conjugated diene, the said block copolymer comprising from 50 to 82% by weight of polymerized monomer (b), having a peak molecular weight ranging from 75000 to 350000, and having the general formula $A_1$-X-$A_2$ in which $A_1$ and $A_2$ represent polymeric endblocks of monovinyl aromatic monomers (a), and X elastomeric segments essentially constituted of polymerized conjugated diene monomers (b), the total amount of copolymer (II) in the bituminous component (I) ranging from 1 to 20% by weight of the total (I)+(II), wherein the said copolymer contains endblocks $A_1$ and $A_2$ have two different peak molecular weights, one being comprised between 15000 and 60000 and one being comprised between 5000 and 25000 whereby the linear block copolymer has an asymmetric structure, the ratio (c) of the highest to the lowest peak molecular weight being equal to or greater than 1.2.

20. A water proofing material including a bituminous composition essentially consisting of:

(i) a bituminous component having a penetration grade according to ASTM D5-75 ranging from 3 to 30 mm at 25° C., and (ii) at least one linear block copolymer constituted of polymerized monomer units of (a) at least one monovinyl aromatic hydrocarbon and (b) at least one conjugated diene, the said block copolymer comprising from 50 to 82% by weight of polymerized monomer (b), having a peak molecular weight ranging from 75000 to 350000, and having a general formula $A_1$-X-$A_2$ in which $A_1$ and $A_2$ represent polymeric endblocks of monovinyl aromatic monomers (a), and X elastomeric segments essentially constituted of polymerized conjugated diene monomers (b), the total amount of copolymer (II) in the bituminous component (I) ranging from 1 to 20% by weight of the total (I)+(II), wherein the said copolymer contains endblocks $A_1$ and $A_2$ have two different peak molecular weights, one being comprised between 15000 and 60000 and one being comprised between 5000 and 25000 whereby the linear block copolymer has an asymmetric structure, the ratio (c) of the highest to the lowest peak molecular weight being equal to or greater than 1.2.

* * * * *